(12) United States Patent
Czachor et al.

(10) Patent No.: US 7,008,181 B2
(45) Date of Patent: Mar. 7, 2006

(54) GAS TURBINE ENGINE AIR BAFFLE FOR A ROTATING CAVITY

(75) Inventors: Robert Paul Czachor, Cincinnati, OH (US); Michael Charles Eckert, West Chester, OH (US); Richard William Albrecht, Fairfield, OH (US); Steven Alan Ross, Cincinnati, OH (US)

(73) Assignee: General Electric Co., Schenectady, NY (US)

(*) Notice: Subject to any disclaimer, the term of this patent is extended or adjusted under 35 U.S.C. 154(b) by 149 days.

(21) Appl. No.: 10/654,672

(22) Filed: Sep. 4, 2003

(65) Prior Publication Data
US 2005/0053460 A1    Mar. 10, 2005

(51) Int. Cl.
*F03B 11/00* (2006.01)

(52) U.S. Cl. .............................. 415/121.2; 415/169.1; 416/247 R

(58) Field of Classification Search ............... 415/115, 415/116, 9, 121.2, 169.1, 229; 416/95, 96 R, 416/97 R, 220 R, 221, 247 R, 244 R
See application file for complete search history.

(56) References Cited

U.S. PATENT DOCUMENTS

| 4,141,705 | A | 2/1979 | Campolong |
| 4,361,213 | A | 11/1982 | Landis, Jr. et al. |
| 5,215,440 | A | 6/1993 | Narayana et al. |
| 5,498,273 | A | 3/1996 | Mann |
| 5,733,103 | A | 3/1998 | Wallace et al. |
| 6,524,061 | B1 * | 2/2003 | Hirokawa et al. .......... 415/114 |

* cited by examiner

*Primary Examiner*—Edward K. Look
*Assistant Examiner*—Dwayne J. White
(74) *Attorney, Agent, or Firm*—William Scott Andes; Steven J. Rosen

(57) ABSTRACT

An annular air baffle disposed in a cavity of a rotatable gas turbine engine part includes an annular split ring supporting a plurality of circumferentially spaced apart fins. The cavity is closed at a radially outer diameter and open at a radially inner diameter of the part. The ring and the fins may be integrally formed in one piece. The fins may have common surfaces with the ring and the common surfaces may be circular cross-sectional surfaces of the ring and radially outer rounded corners of the fins. The fins may have triangular cross-sectional shapes with first, second, and third sides, rounded first radially inner corners between the first and second sides, rounded second radially inner corners between the second and third sides, and the radially outer rounded corners between the first and third sides. The fins may extend radially inwardly from the annular split ring.

44 Claims, 5 Drawing Sheets

GAS TURBINE ENGINE AIR BAFFLE FOR A ROTATING CAVITY

BACKGROUND OF THE INVENTION

1. Field of the Invention

The invention relates to aircraft gas turbine engine turbine cooling systems and, particularly, to rotating annular cavities that accumulate debris from such systems.

2. Description of Related Art

Gas turbine engines typically include a core engine having in serial, axial flow relationship, a high pressure compressor to compress the airflow entering the core engine, a combustor in which a mixture of fuel and the compressed air is burned to generate a hot gas flow. A high pressure turbine is rotated by the hot gas flow and drives the high pressure compressor through an interconnecting high pressure shaft. A low pressure turbine aft of the high pressure turbine drives a fan forward of the high pressure compressor by a low pressure shaft. Various cooling systems are used to duct relatively cool compressor air to the turbine for cooling purposes. The cooling air for turbine cooling contains a small amount of dust and debris which can accumulate in various annular cavities in the turbine as well as other rotating parts of the engine. As an example, cooling air may be flowed though holes in a shaft of a turbine disk and accumulate in an adjacent annular cavity in a hub of the disk. Such an arrangement may be found in a high pressure turbine of a General Electric CF6-80 series engine.

Such cavities are closed at an outer diameter and open at an inner diameter of the hub. Dust and debris can become entrapped and build up over time with continued operation of the engine. Since the rotor internal airflow usually has both axial and circumferential velocity relative to the rotor, such debris can circumferentially scrub the rotating part internal surfaces and, over time, cause damage to the parts.

It is highly desirable to have an apparatus that can prevent debris from circumferentially scrubbing internal surfaces of rotating part cavities that are closed at an outer diameter and open at an inner diameter of the parts and which over time can cause damage to the parts.

SUMMARY OF THE INVENTION

An annular air baffle for use with a cavity of an annular rotatable gas turbine engine part includes an annular split ring supporting a plurality of circumferentially spaced apart fins. The cavity is closed at a radially outer diameter and open at a radially inner diameter of the part. The ring and the fins may be integrally formed in one piece. In the exemplary embodiment of the ring, the fins have common surfaces with the ring. The common surfaces are circular cross-sectional surfaces of the ring and radially outer rounded corners of the fins. The fins have triangular cross-sectional shapes with first, second, and third sides, rounded first radially inner corners between the first and second sides, rounded second radially inner corners between the second and third sides, and the radially outer rounded corners between the first and third sides. The fins extend radially inwardly from the annular split ring. The fins may have other cross-sectional shapes such as circular or the fins may be hemispherical.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
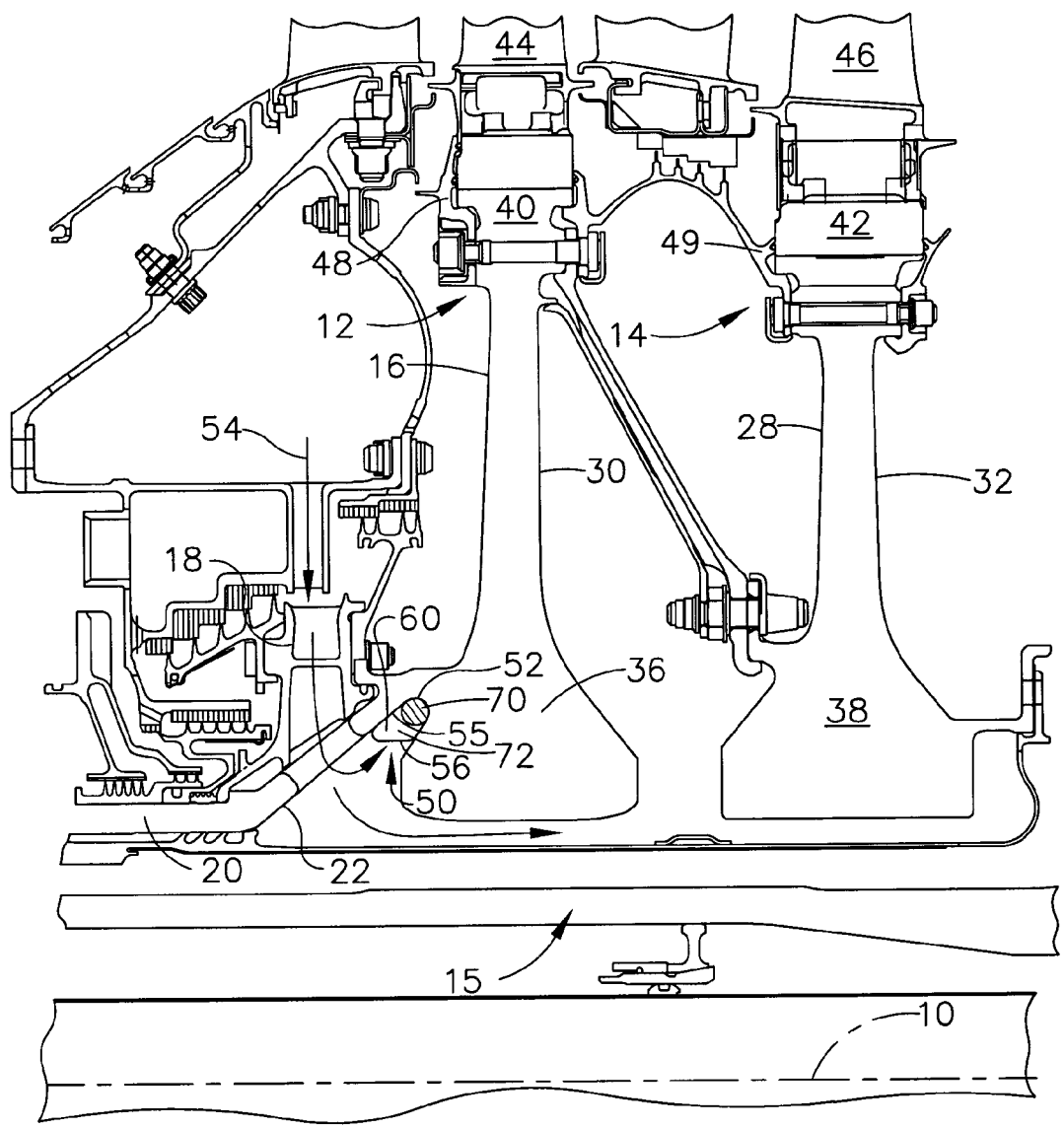
FIG. 1 is a longitudinal sectional view illustration of an exemplary air baffle in a rotatable cavity of a hub of a turbine disk in a gas turbine engine.

Illustrated in FIG. 1 are high pressure turbine first and second stage disk assemblies 12 and 14 of a high pressure turbine assembly 15 circumscribed about an engine centerline 10 of a gas turbine engine such as a General Electric CF6-80 aircraft gas turbine engine. The first and second stage disk assemblies 12 and 14 include first and second disks 16 and 28 having slotted first and second rims 40 and 42 which receive first and second turbine blades 44 and 46, respectively, in a dovetail fit. First and second blades 44 and 46 are retained within their respective first and second rims 40 and 42 by first and second blade retainers 48 and 49, respectively. The first and second disks 16 and 28 include first and second webs 30 and 32 extending radially inwardly from the first and second rims 40 and 42, to first and second hubs 36 and 38, respectively. The first stage disk assembly 12 includes a cooling air deswirler 18 carried by a conical connection 22 to a cylindrical shaft 20 extending axially forwardly from the first hub 36 of the disk 16.

Figure 2:
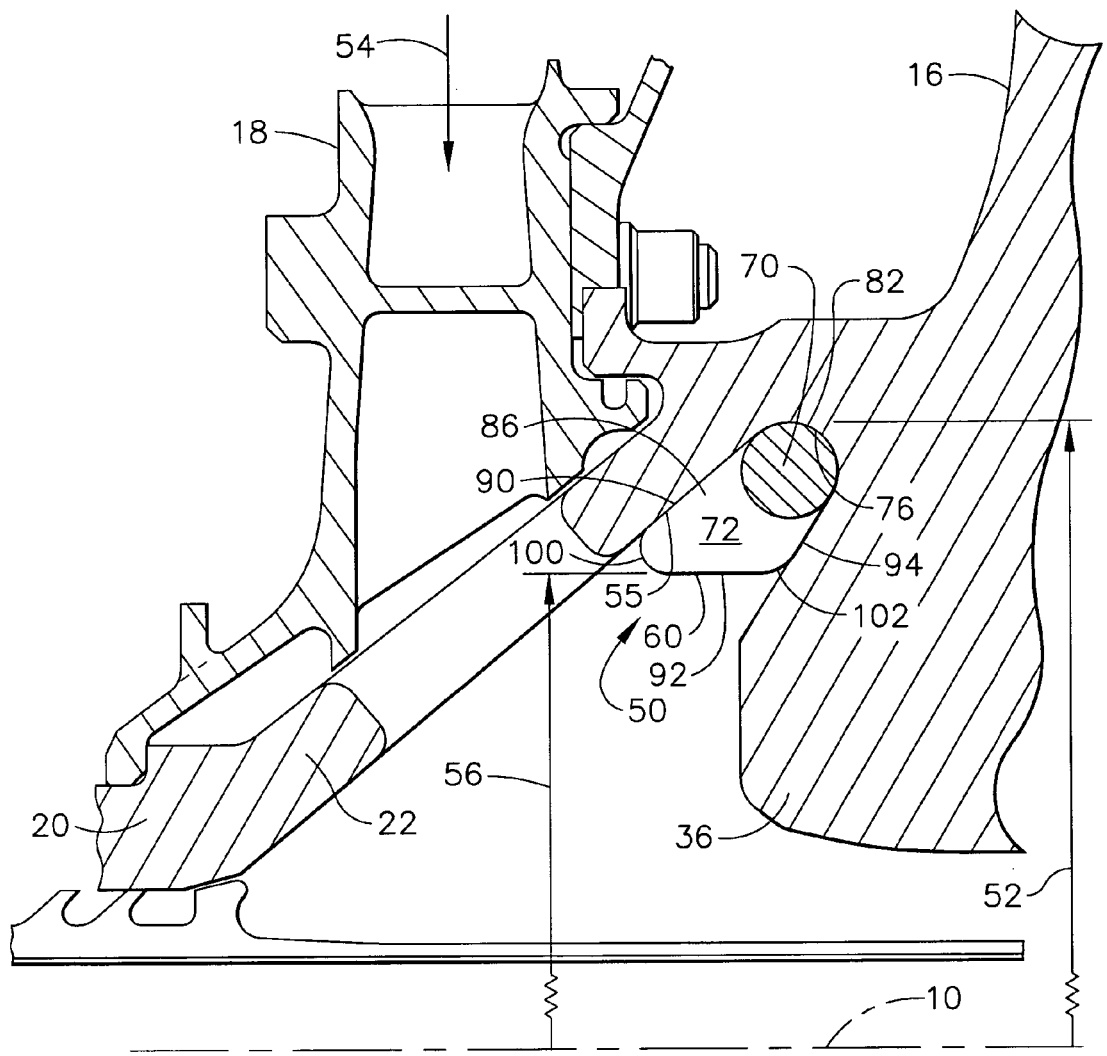
FIG. 2 is an enlarged sectional view illustration of the air baffle in the rotatable cavity illustrated in FIG. 1.

Referring to FIG. 2, an annular cavity 50 between the conical connection 22 to the cylindrical shaft 20 and the first hub 36 is closed at an outer diameter (OD) 52 of the first hub 36 and open and exposed to internal cooling airflow 54 passing through the cooling air deswirler 18 at an inner diameter (ID) 56 of the first hub 36. Dust and debris in the internal cooling airflow 54 can become entrapped and build up in the cavity 50 over time with continued operation of the engine. The internal cooling airflow 54 has both axial and circumferential velocities relative to the rotating first hub 36. Debris entrained in the internal cooling airflow 54 can circumferentially scrub rotating internal surfaces 55 of the rotating first hub 36 and, over time, cause damage to the first hub 36 and first disk 16.

The above exemplifies a general problem that may occur in a rotating or rotatable annular gas turbine engine part having a cavity 50 closed at a radially outer diameter 52 and open and exposed to internal airflow at a radially inner diameter 56 of the part exemplified by the first hub 36. Centrifugal forces tend to extract dust and debris from the internal cooling airflow 54, trapping it in the radially inwardly facing cavity 50. Dust and debris then rotates in the cavity 50 relative to the rotating part causing a scrubbing action which then causes abrasive damage to the disk in a region including the cavity 50. This damage can be severe enough to cause the disk to be unserviceable at overhaul.

An annular air baffle 60 disposed in the annular cavity 50 is used to reduce or prevent this damage. The air baffle 60 reduces or eliminates the differential in circumferential velocity between the cooling flow and the rotating gas turbine engine part, thereby, preventing entrained debris from scrubbing the surface of the rotating part. The air baffle 60 also acts as a physical barrier that prevents entrained debris from scrubbing the surface of the rotating part.

Figure 3:
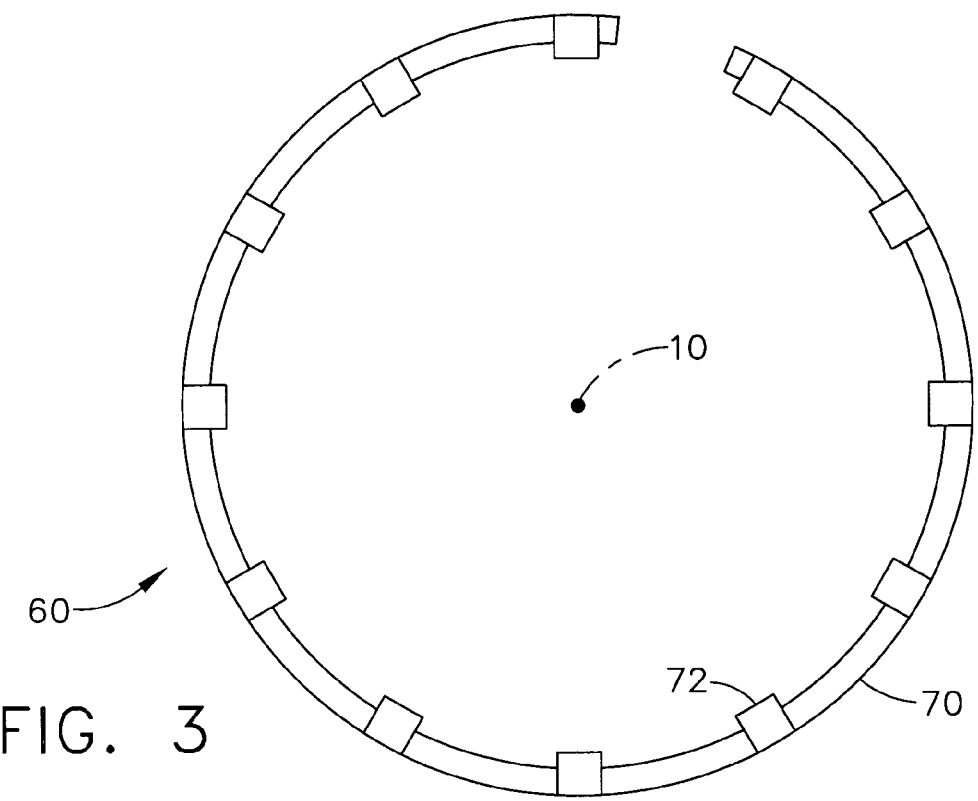
FIG. 3 is an axial sectional view illustration of the of the air baffle illustrated in FIG. 1.
Figure 4:
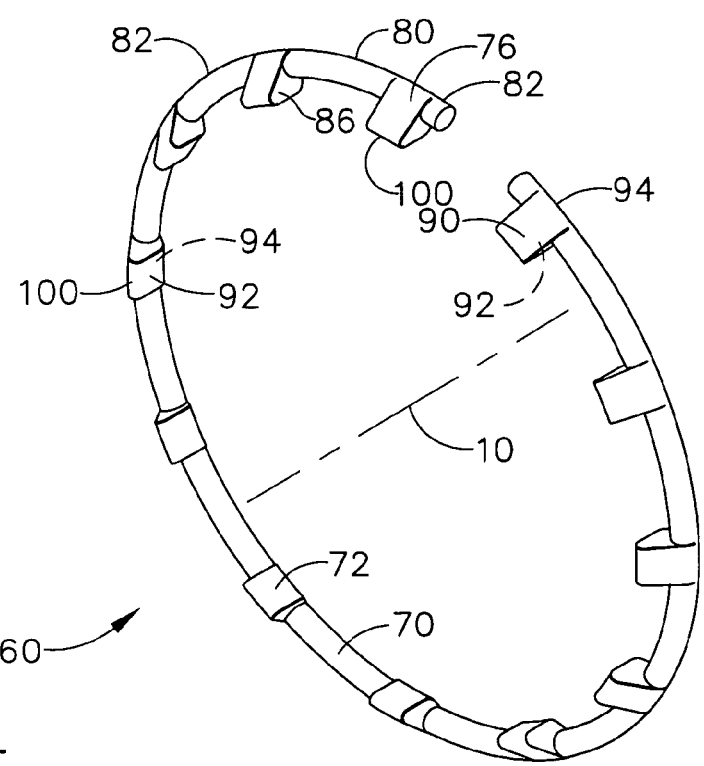
FIG. 4 is a perspective view illustration of the of the air baffle illustrated in FIG. 1.

Referring to FIGS. 2–3, the air baffle 60 includes an annular split ring 70 having a plurality of circumferentially spaced apart fins 72 attached to the ring. In the exemplary embodiment of the air baffle 60 illustrated in the FIGS., the ring 70 and the fins 72 are integrally formed in one piece. The ring 70 and the fins 72 may also be fabricated separately and then assembled to form the air baffle 60. The fins 72 generally conform to a shape of the cavity 50 and thus are substantially as wide as the ring 70 in order to prevent dust and debris from rotating in the cavity 50. They may be thick or thin. The fins 72 have common surfaces 76 with the ring 70 illustrated herein as circular cross-sectional surfaces 80 of the ring 70 and radially outer rounded corners 82 of the fins. The fins 72 are turned to match a contour of the cavity 50 or the first hub 36 or the first disk 16. This would form spherical shaped common surfaces 76 of the fins 72 and the ring 70 in the exemplary embodiments illustrated herein.

The fins 72 illustrated in FIGS. 1–4 have triangular cross-sectional shapes 86 with first, second, and third sides 90, 92, and 94, respectively. Rounded first radially inner corners 100 disposed between the first and second sides 90 and 92 and rounded second radially inner corners 102 disposed between the second and third sides 92 and 94. The radially outer rounded corners 82 are disposed between the first and third sides 90 and 94. The fins 72 extend radially inwardly from the annular split ring 70. The ring 70 is illustrated in FIGS. 1–4 as having a circular cross-sectional shape.

Figure 5:
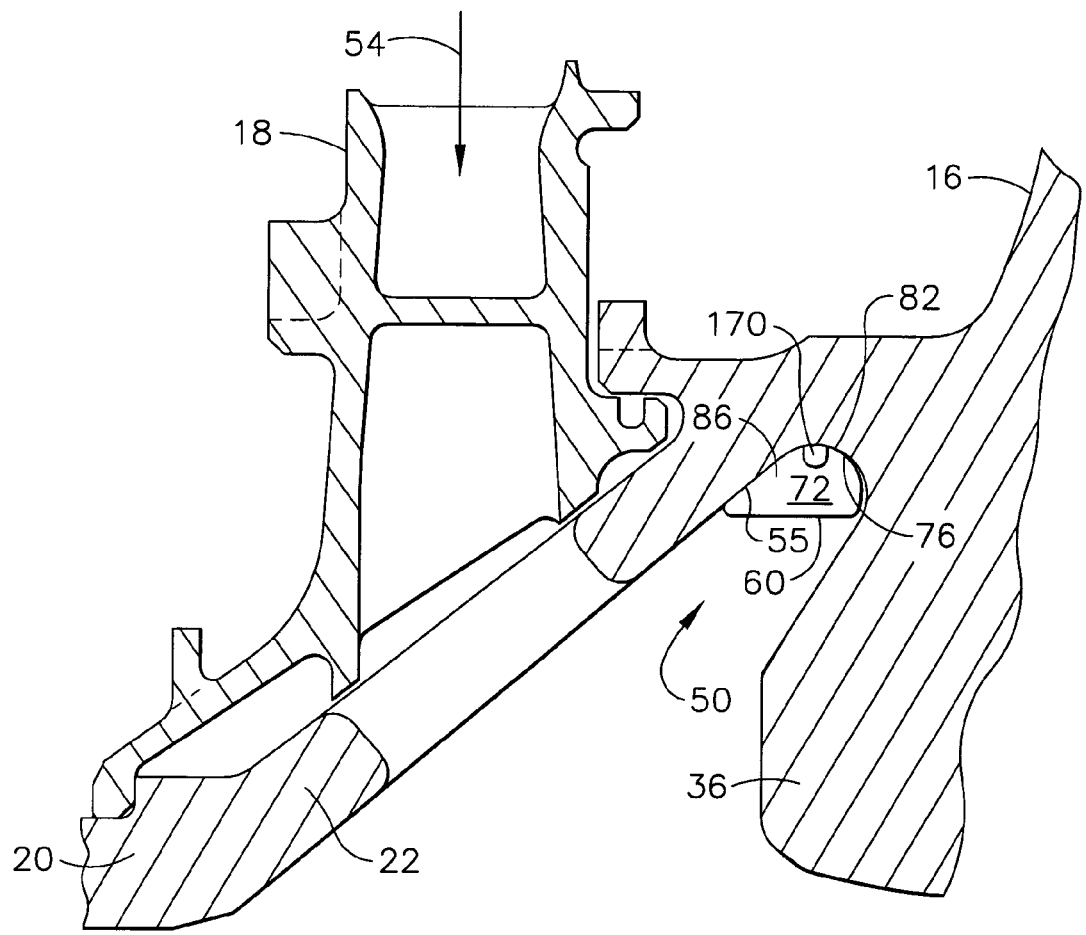
FIG. 5 is an axial sectional view illustration of a first exemplary alternative embodiment of the air baffle illustrated in FIG. 1.
Figure 6:
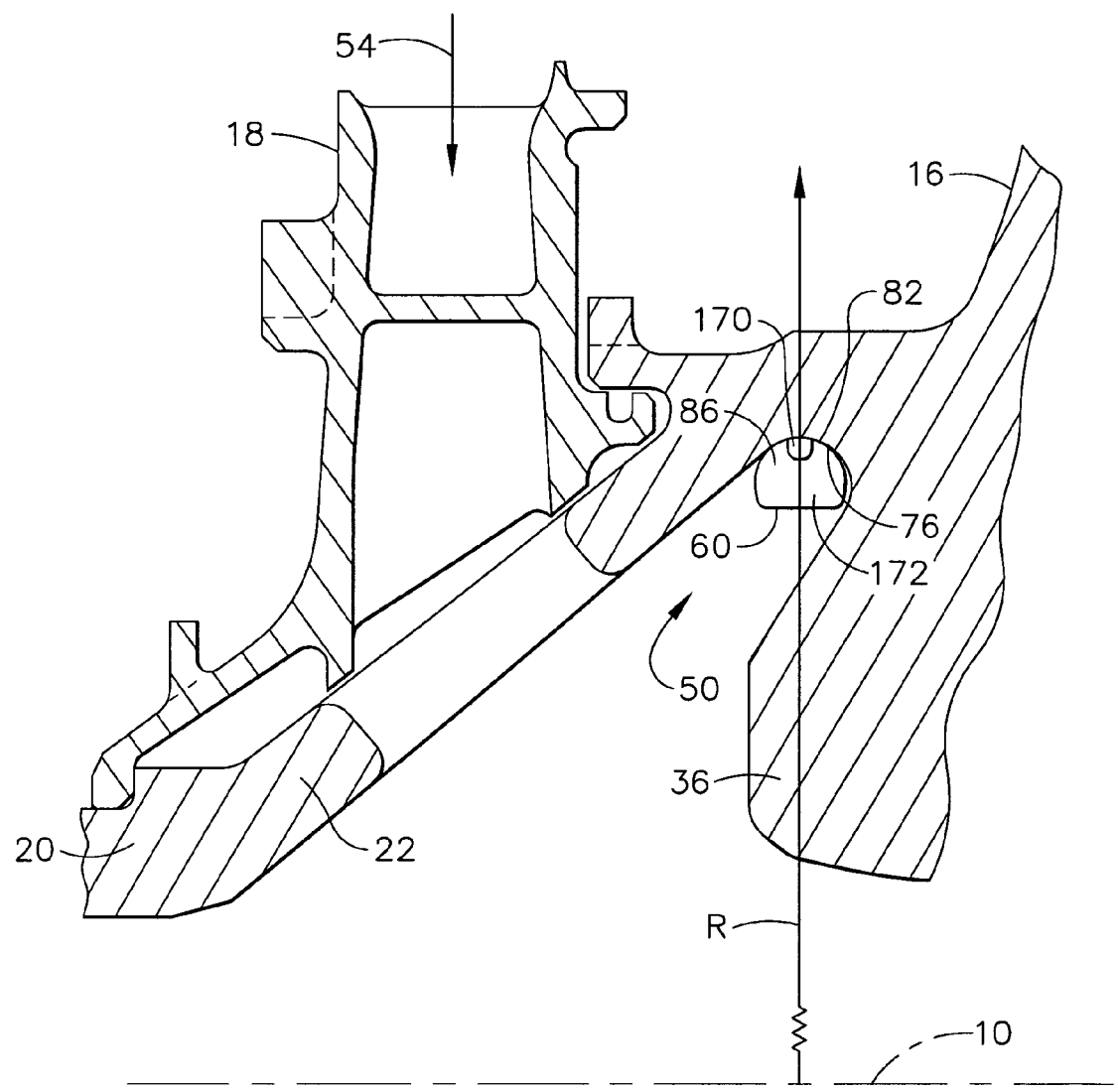
FIG. 6 is an axial sectional view illustration of a second exemplary alternative embodiment of the air baffle illustrated in FIG. 1.

The fins 72 and ring 70 may have alternative shapes. The fins 72 may have other cross-sectional shapes such as circular or the fins may be hemispherical. Illustrated in FIG. 5 is an annular air baffle 60 with a smaller somewhat pie-shaped fin 72 having a rectangular cross-sectional ring 170. Illustrated in FIG. 5 is an annular air baffle 60 having symmetrical fins 172 that are symmetrical about a radius R normal to the engine centerline 10 which is also the axis of rotation of the ring 70 as well as the rectangular cross-sectional ring 170. This allows the annular air baffle 60 to be inserted into the cavity 50 backwards or forwards. This is often referred to as Murphy Proofing to avoid the air baffle 60 being inserted in a position that doesn't reduce or prevent entrained debris from scrubbing the surface of the rotating part. The symmetrical fins 172 have circular cross-sectional shapes.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An annular air baffle comprising:
   an annular split ring,
   a plurality of circumferentially spaced apart fins attached to the ring, and
   each of the fins are substantially as wide as the ring.

2. An annular air baffle as claimed in claim 1 further comprising the ring and the fins being integrally formed in one piece.

3. An annular air baffle as claimed in claim 2 further comprising the fins having common surfaces with the ring.

4. An annular air baffle as claimed in claim 1 further comprising the fins having common surfaces with the ring.

5. An annular air baffle as claimed in claim 1 further comprising:
   the fins having triangular cross-sectional shapes with first, second, and third sides, respectively,
   rounded first radially inner corners disposed between the first and second sides,
   rounded second radially inner corners disposed between the second and third sides, and
   radially outer rounded corners disposed between the first and third sides.

6. An annular air baffle as claimed in claim 5 further comprising the fins having common surfaces with the ring and the common surfaces being circular cross-sectional surfaces of the ring and radially outer rounded corners of the fins.

7. An annular air baffle as claimed in claim 1 further comprising the fins being symmetrical about a radius R normal to an axis of rotation of the ring.

8. An annular air baffle as claimed in claim 7 further comprising the ring and the fins being integrally formed in one piece.

9. An annular air baffle as claimed in claim 8 further comprising the fins having common surfaces with the ring.

10. An annular air baffle comprising:
    an annular split ring,
    a plurality of circumferentially spaced apart fins attached to the ring,
    the ring and the fins being integrally formed in one piece,
    the fins having common surfaces with the ring, and
    the common surfaces being circular cross-sectional surfaces of the ring and radially outer rounded corners of the fins.

11. An annular air baffle as claimed in claim 10 further comprising:
    the fins having triangular cross-sectional shapes with first, second, and third sides, respectively,
    rounded first radially inner corners disposed between the first and second sides,
    rounded second radially inner corners disposed between the second and third sides, and
    the radially outer rounded corners disposed between the first and third sides.

12. An annular air baffle as claimed in claim 11 further comprising the fins extending radially inwardly from the annular split ring.

13. An annular air baffle comprising:
    an annular split ring,
    a plurality of circumferentially spaced apart fins attached to the ring,
    the fins having common surfaces with the ring, and
    the common surfaces being circular cross-sectional surfaces of the ring and radially outer rounded corners of the fins.

14. An annular air baffle as claimed in claim 13 further comprising:
    the fins having triangular cross-sectional shapes with first, second, and third sides, respectively,
    rounded first radially inner corners disposed between the first and second sides,
    rounded second radially inner corners disposed between the second and third sides, and
    the radially outer rounded corners disposed between the first and third sides.

15. An annular air baffle as claimed in claim 14 further comprising, the fins extending radially inwardly from the annular split ring.

16. A rotatable annular gas turbine engine part comprising:
   a cavity closed at a radially outer diameter and open at a radially inner diameter of a first hub,
   an annular air baffle disposed within the cavity,
   the air baffle including an annular split ring, and
   a plurality of circumferentially spaced apart fins attached to the ring.

17. A part as claimed in claim 16 further comprising the ring and the fins being integrally formed in one piece.

18. A part as claimed in claim 17 further comprising the fins having common surfaces with the ring.

19. A part as claimed in claim 18 further comprising the common surfaces being circular cross-sectional surfaces of the ring and radially outer rounded corners of the fins.

20. A part as claimed in claim 19 further comprising:
   the fins having triangular cross-sectional shapes with first, second, and third sides, respectively,
   rounded first radially inner corners disposed between the first and second sides,
   rounded second radially inner corners disposed between the second and third sides, and
   the radially outer rounded corners disposed between the first and third sides.

21. A part as claimed in claim 20 further comprising the fins extending radially inwardly from the annular split ring.

22. A part as claimed in claim 16 further comprising the fins having common surfaces with the ring.

23. A part as claimed in claim 22 further comprising the common surfaces being circular cross-sectional surfaces of the ring and radially outer rounded corners of the fins.

24. A part as claimed in claim 23 further comprising:
   the fins having triangular cross-sectional shapes with first, second, and third sides, respectively,
   rounded first radially inner corners disposed between the first and second sides,
   rounded second radially inner corners disposed between the second and third sides, and
   the radially outer rounded corners disposed between the first and third sides.

25. A part as claimed in claim 24 further comprising the fins extending radially inwardly from the annular split ring.

26. A part as claimed in claim 16 further comprising:
   the fins having triangular cross-sectional shapes with first, second, and third sides, respectively,
   rounded first radially inner corners disposed between the first and second sides,
   rounded second radially inner corners disposed between the second and third sides, and
   radially outer rounded corners disposed between the first and third sides.

27. A part as claimed in claim 26 further comprising the ring and the fins being integrally formed in one piece.

28. A high pressure turbine assembly comprising:
   high pressure turbine first and second stage disk assemblies circumscribed about a centerline.
   the first and second stage disk assemblies including first and second disks having first and second rims supporting first and second turbine blades, respectively,
   first and second webs extending radially inwardly from the first and second rims, to first and second hubs, respectively,
   a conical connection to a cylindrical shaft extending axially forwardly from the first hub of the disk,
   an annular cavity between the conical connection to the cylindrical shaft and the first hub,
   the cavity closed at a radially outer diameter and open at a radially inner diameter of the first hub,
   an annular air baffle disposed within the cavity,
   the air baffle including an annular split ring, and
   a plurality of circumferentially spaced apart fins attached to the ring.

29. An assembly as claimed in claim 28 further comprising the ring and the fins being integrally formed in one piece.

30. An assembly as claimed in claim 29 further comprising the fins having common surfaces with the ring.

31. An assembly as claimed in claim 30 further comprising the common surfaces being circular cross-sectional surfaces of the ring and radially outer rounded corners of the fins.

32. An assembly as claimed in claim 31 further comprising:
   the fins having triangular cross-sectional shapes with first, second, and third sides, respectively,
   rounded first radially inner corners disposed between the first and second sides,
   rounded second radially inner corners disposed between the second and third sides, and
   the radially outer rounded corners disposed between the first and third sides.

33. An assembly as claimed in claim 32 further comprising the fins extending radially inwardly from the annular split ring.

34. An assembly as claimed in claim 28 further comprising the fins having common surfaces with the ring.

35. An assembly as claimed in claim 34 further comprising the common surfaces being circular cross-sectional surfaces of the ring and radially outer rounded corners of the fins.

36. An assembly as claimed in claim 35 further comprising:
   the fins having triangular cross-sectional shapes with first, second, and third sides, respectively,
   rounded first radially inner corners disposed between the first and second sides,
   rounded second radially inner corners disposed between the second and third sides, and
   the radially outer rounded corners disposed between the first and third sides.

37. An assembly as claimed in claim 36 further comprising the fins extending radially inwardly from the annular split ring.

38. An assembly as claimed in claim 28 further comprising:
   the fins having triangular cross-sectional shapes with first, second, and third sides, respectively,
   rounded first radially inner corners disposed between the first and second sides,
   rounded second radially inner corners disposed between the second and third sides, and
   radially outer rounded corners disposed between the first and third sides.

39. An assembly as claimed in claim 38 further comprising the ring and the fins being integrally formed in one piece.

40. An assembly as claimed in claim 39 further comprising the fins being symmetrical about a radius R normal to the engine centerline.

41. An assembly as claimed in claim 40 further comprising the ring and the fins being integrally formed in one piece.

42. An assembly as claimed in claim 41 further comprising the fins having common surfaces with the ring.

43. An annular air baffle comprising:
an annular split ring,
a plurality of circumferentially spaced apart fins attached to the ring,
the ring and the fins being integrally formed in one piece,
the fins having common surfaces with the ring, and
the common surfaces being circular cross-sectional surfaces of the ring and radially outer rounded corners of the fins.

44. An annular air baffle as claimed in claim 43 further comprising the fins extending radially inwardly from the annular split ring.

* * * * *